United States Patent [19]

Keller

[11] 4,428,143
[45] Jan. 31, 1984

[54] STOPS FOR LINES

[76] Inventor: Willy Keller, Imbisbühlstr. 12, CH-8049 Zürich, Switzerland

[21] Appl. No.: 246,041

[22] Filed: Mar. 20, 1981

[30] Foreign Application Priority Data

Mar. 28, 1980 [CH] Switzerland ............... 2457/80

[51] Int. Cl.³ ................................................ A01K 91/00
[52] U.S. Cl. ......................................................... 43/44.9
[58] Field of Search ................ 43/43.1, 44.89, 44.9, 43/44.91, 44.92, 44.98; 24/115 J, 115 R, 115 A; 156/92

[56] References Cited

U.S. PATENT DOCUMENTS

| 419,574 | 1/1890 | Vasseur | 43/44.92 |
|---|---|---|---|
| 698,247 | 4/1902 | Bernhard | 24/115 A |
| 3,435,552 | 4/1969 | Caldwell | 43/44.98 |
| 3,733,243 | 5/1973 | Crawford | 156/92 |
| 3,861,811 | 1/1975 | Mason | 24/115 A |
| 4,048,744 | 9/1977 | Chandler | 43/44.98 |
| 4,145,833 | 3/1979 | Ratte | 43/44.89 |
| 4,200,962 | 5/1980 | Niedecker | 24/115 A |
| 4,236,281 | 12/1980 | Bottum | 24/115 R |

Primary Examiner—Nicholas P. Godici
Assistant Examiner—Marc Hodak
Attorney, Agent, or Firm—Kenyon & Kenyon

[57] ABSTRACT

Stops made of a synthetic plastics material in two parts welded together at least at individual locations with a fishing line made of "Nylon". The two parts surround with their inner surfaces a hollow space and form an inner wall with elevations. On welding by means of an ultrasonic field at least edges of the elevations melt together with the fishing line and form a non-detachable connection. By means of radial grooves on the outer side the rigid stop achieves a certain pliability so that a certain transfer from line to stop does not cause any break in the line. Such stops are suitable in ocean fishing for limiting the length of displacement of the swivels.

9 Claims, 4 Drawing Figures

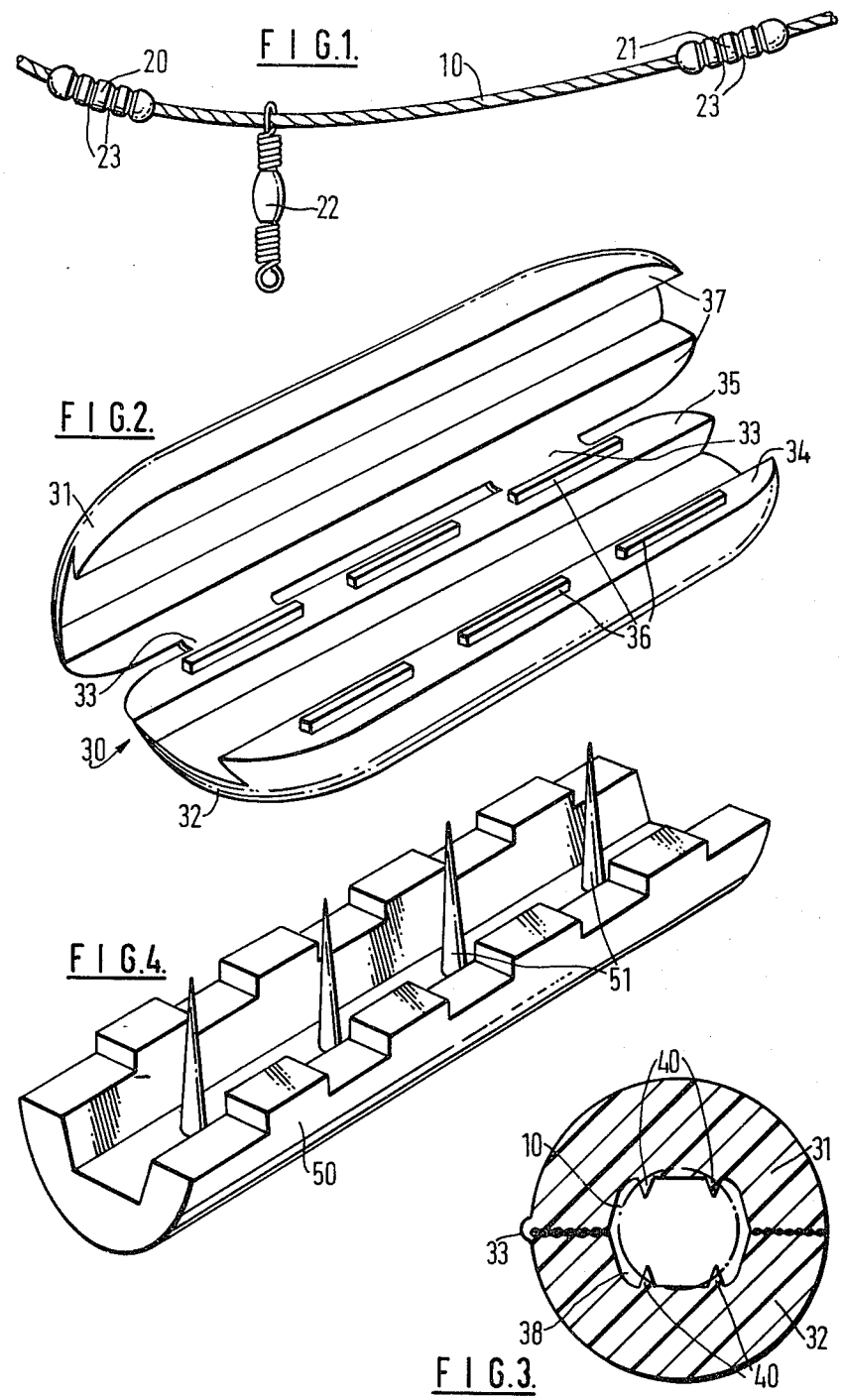

STOPS FOR LINES

This invention relates to stops for limiting longitudinal movement of holding means arranged for free movement on a line of synthetic plastics material.

Stops are known within the fishing area and are employed for limiting the freedom of movement of various swivels or the like. Hitherto, with lines of hemp or other natural fibers, such stops could be readily manufactured by winding the fishing lines with a thinner thread. As a consequence of expansion of the material, such stops and the fishing line press themselves and the adherence was sufficiently good.

In later times, fishing lines are often used made of a monofilament synthetic plastics material having a diameter of 1-2 millimeters. One readily realizes that the known stops in the form of windings are not advantageous in such instances. Tests with stops composed of synthetic plastics materials which are arranged directly on the fishing line by extrusion and which by virtue of a certain shrinking of the material also exhibit a certain adherence, showed on application in cold ocean water that the temperature-dependence properties were very different, and that the stops could loosen.

Stops of metal are often unsuitable for ocean fishing by virtue of corrosion and damage to the lines as a result of mechanical action.

An object of the present invention is, therefore, to provide stops consisting of non-corrosive material which by virtue of simple production and a reasonable price satisfy most needs, especially for ocean fishing.

Accordingly, the present invention resides in a stop for limiting the longitudinal movement of holding means arranged for free movement on a line made of a synthetic plastics material. The stop has a cylindrical hollow body made of a synthetic thermoplastics material with its inner surface adapted to be melted together with the line at least at individual locations.

The invention also includes a method of limiting longitudinal movement of holding means arranged for free movement on a line made of a synthetic plastics material which comprises placing on the line a stop having a cylindrical hollow body made of a synthetic plastics material, and arranging the body in a heating field in order that its inner surface and the line are melted together at least at individual locations.

In order that the invention can be more clearly understood, convenient embodiments thereof will now be described, by way of example, with reference to the accompanying drawings in which:

FIG. 1 is an elevation of a section of a fishing line with two stops according to the invention and a swivel, FIG. 2 is a perspective view of a stop of a first embodiment in a position before fastening it on the fishing line, FIG. 3 is a cross-section through a stop on a fishing line shown on a larger scale than in FIG. 1, and FIG. 4 is a perspective view of one part of a two part stop of a second embodiment in position before fastening of the fishing line.

Referring to FIG. 1, a monofilament line 10, for example of a polycondensation material of hexamethylene diamine and adipic acid, "Nylon", is provided with two stops 20, 21 which are arranged at a distance from each other, together with a swivel 22 of known design which is arranged between the stops. "Nylon" had good properties for use during ocean fishing since it has very good tensile strength and high resistance to rubbing, is elastic and pliable and tolerates temperatures down to far below the freezing point and loses over longer intervals in the ocean water only little of the original solidity.

Referring to FIGS. 2 and 3, each stop is formed as a two part body 30. The two halves 31, 32 are connected together along their respective edges, for example, by means of two flaps 33. The one half 32 is designed on separation surfaces 34, 35 with elevations 36. In the joined condition, separation surfaces 37 of the other half 31 rest on the elevations 36. On heating above the softening temperature, these elevations flow out between separation surfaces which rest against each other and function as flux material on welding.

As FIG. 3 clearly shows, the inner sides of the two halves 31, 32 are also designed with elevations, namely an elevation 40 in the one half 31 and an elevation 41 in the other half. These elevations, which in a section across the longitudinal axis of the stop form spike-like points, can in reality be longitudinal ribs. However, it is also conceivable that several points will be able to be arranged which are disposed in series or displaced relative to each other.

In FIG. 3, there is indicated, with a chain line, the approximate mass relationship between parts of the stop and a fishing line 10.

As can be readily understood, the elevations 40, 41 press, whether these are formed as points or ribs, against the fishing line. On heating the stop halves 31, 32 to above the softening point or respectively to the melting temperature, there is produced a melting together of at least the elevations 40, 41 with the fishing line 10.

Heating by means of an ultrasonic field has proved to be particularly advantageous since there can be accomplished a complete melting together of at least the elevations 40, 41 with the line 10. Possibly, there occurs by means of the ultrasonic field, an increase on the edges of the ribs of the intensity as a consequence of the conical design and with this a concentration of the energy for heating to above the melting temperature and thereby a melting together of the material of the stop with the material of the line.

A stop half 50 of a second embodiment is shown in FIG. 4. In this case too, there can also be arranged ribs, points or the like of a synthetic plastics material. The most essential in this embodiment are, however, spikes 51 which are arranged in the one half and which are adapted to be forced through the line and the inner walls of the other half.

Such spikes preferably consist of metal, while the stops themselves in both embodiments consist of a synthetic plastics material, preferably of the afore-mentioned "Nylon".

As mentioned above, "Nylon" distinguishes itself by great pliability. Thus when such stops 21, 22 having a length of, for example, 18 millimeters are fastened mutually spaced apart on a line 10 (FIG. 1), this forms rigid locations which under the great stresses during fishing can lead to breaks in the fishing line.

Notwithstanding this, in order to have a certain minimum movement also at the locations where the stops are present, the stops 20 (FIG. 1) are preferably designed with radial grooves 23, which, for example, can have a mutual distance of 1.5 millimeters and a depth of 1 millimeter for a stop diameter of 5 millimeters. With a bore 38 (FIG. 3) of 2.4 millimeters when a line is used of two millimeters diameter, one will then have a wall thickness of 0.3 millimeters at the finished locations in the grooves and thereby there will be able to be produced, practially speaking, uniform pliability over the whole length of the fishing line.

I claim:

1. A stop for a synthetic monofilament fishing line, said stop having a pair of elongated body halves of synthetic thermoplastic material hinged together for closing over and about a fishing line of synthetic monofilament plastic material, at least one of said halves having a longitudinal recess for receiving the fishing line and elevations thereon for abutting a surface of the other of said halves upon hinging together of said halves, said elevations functioning as flux material on thermowelding of said halves together and to the synthetic fishing line, and a plurality of longitudinally spaced radial grooves in an outer periphery of each body half to reduce the wall thickness of said half thereat and impart pliability to said stop when thermowelded to the fishing line.

2. A stop according to claim 1 wherein said elevations are longitudinal ribs.

3. A stop according to claim 1 further having a plurality of metal pins anchored in said body halves for penetrating the line upon closure of said body halves on each other about the line to form a hollow body.

4. A stop as set forth in claim 1 wherein at least one of said halves has points within said recess for penetrating into the fishing line upon closing of said halves together.

5. A stop as set forth in claim 4 wherein each point is a metal pin of a length to penetrate into the other of said halves upon closing of said halves together.

6. In combination a fishing line of monofilament synthetic material; and a plurality of cylindrical stops of thermoplastic material mounted on and about said line in longitudinally spaced manner, each said stop being thermowelded to said line and having a pair of body halves hinged together over said line and thermowelded to each other and a plurality of longitudinally spaced annular grooves in an outer periphery to reduce the wall thickness of said body thereat and impart pliability to said stop and said line.

7. The combination as set forth in claim 6 wherein said body has internal ribs thermowelded to said line.

8. The combination as set forth in claim 6 wherein said body has metal pins penetrating said line.

9. The combination as set forth in claim 6 wherein said line has a diameter of from 1 to 2 millimeters and each stop has a length of 18 millimeters.

* * * * *